United States Patent
Kraus et al.

(10) Patent No.: US 6,240,745 B1
(45) Date of Patent: Jun. 5, 2001

(54) PROCESS AND PLANT FOR THE PURIFICATION AND CRYOGENIC SEPARATION OF AIR WITHOUT PRECOOLING

(75) Inventors: Georges Kraus, Paris; Patrick Le Bot, Vincennes; Alain Guillard, Paris; Philippe Fraysse, Fontenay-aux-Roses, all of (FR)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/503,182

(22) Filed: Feb. 14, 2000

(30) Foreign Application Priority Data

Mar. 12, 1999 (FR) .................................... 99 03064

(51) Int. Cl.[7] ....................................... F25J 3/00
(52) U.S. Cl. ............................... 62/644; 62/408
(58) Field of Search .............................. 62/908, 640, 641, 62/644, 643

(56) References Cited

U.S. PATENT DOCUMENTS 4,249,915 * 2/1981 Sircar et al. ........................... 55/26
4,671,813 * 6/1987 Yoshino ................................ 62/908
5,463,869 * 11/1995 Kumar et al. ......................... 62/641
5,689,974 * 11/1997 Fujita et al. .......................... 62/644
5,701,763 * 12/1997 Howard et al. ....................... 62/644

FOREIGN PATENT DOCUMENTS

733393 * 12/1996 (EP) .
0 895 046    2/1999 (EP) .

* cited by examiner

*Primary Examiner*—William Doerrler
(74) *Attorney, Agent, or Firm*—Young & Thompson

(57) ABSTRACT

A plant and a process for the purification and cryogenic separation of air containing impurities, which process is carried out according to the steps of (a) compressing the air; (b) introducing the air compressed in step (a) into one or more adsorption vessels containing particles of adsorbent without, beforehand, precooling the air; (c) adsorbing the impurities ($CO_2$, $H_2O$, $NO_x$, $SO_x$, etc) contained in the air on the particles of adsorbent at room temperature and at a pressure of at least 11.4 bar, preferably ranging from 20.1 to 40 bar; (d) cooling the air purified in step (c) down to a cryogenic temperature; and (e) cryogenically distilling the cooled air in order to produce nitrogen, oxygen, argon or mixtures thereof.

16 Claims, 1 Drawing Sheet

PROCESS AND PLANT FOR THE PURIFICATION AND CRYOGENIC SEPARATION OF AIR WITHOUT PRECOOLING

FIELD OF THE INVENTION

The present invention relates to processes for the separation of atmospheric air by cryogenic distillation which are improved by removing the impurities by adsorption, prior to the distillation.

BACKGROUND OF THE INVENTION

It is known that atmospheric air contains the compounds or impurities that have to be removed before any cryogenic separation of the air, that is to say prior to introducing the air into the heat exchangers of the cold box of an air separation unit.

In particular, mention may be made of the compounds of the carbon dioxide ($CO_2$) and/or water vapour ($H_2O$) type, but also of other impurities.

This is because, in the absence of such a pretreatment of the air, these impurities, particularly $CO_2$ and/or water vapour, would inevitably condense and solidify as ice while the air is being cooled to a cryogenic temperature, something which would cause problems of blocking in the cryogenic separation equipment or unit, especially the heat exchangers, distillation columns, etc., and thereby cause the equipment or unit to be damaged.

To avoid these problems, it is common practice to pretreat the air that has to be cryogenically separated before this cryogenic separation.

This pretreatment of the air is usually called "front end" scrubbing or purification since it is carried out upstream of the cryogenic separation unit.

Currently, the air is pretreated by a TSA (Temperature Swing Adsorption) process or by a PSA (Pressure Swing Adsorption) process depending on the case.

Conventionally, a TSA process cycle comprises the following steps:

a) purification of the air by adsorption of the impurities at superatmospheric pressure;

b) depressurization of the adsorber down to atmospheric pressure or below atmospheric pressure;

c) complete regeneration of the adsorbent at atmospheric pressure using a hot gas, especially the residual gases or waste gases, typically impure nitrogen coming from an air separation unit and heated by means of one or more heat exchangers;

d) cooling of the adsorbent, especially by continuing to introduce into it the residual gas coming from the air separation unit, but not heated;

e) repressurization of the adsorber using the purified air, coming, for example, from another adsorber which is in production phase.

Moreover, as regards a PSA process cycle, this comprises substantially the same steps a), b) and e), but is distinguished from a TSA process by the residual gas or gases not being heated during the regeneration step (step c)), and therefore by the absence of step d) and, in general, a shorter cycle time than in a TSA process.

Preferably, the air pretreatment devices comprise at least two adsorbers, operating in parallel, that is to say alternately, one of the adsorbers being in production phase while the other is in regeneration phase.

Such TSA or PSA air purification processes are described, for instance, in documents U.S. Pat. No. 3,738,084, 5,531,808, 5,587,003 and 4,233,038.

However, it is known that, when particles of adsorbent are used to prepurify the air before it is separated by cryogenic distillation it is common practice to adjust (by water cooling) the temperature of the compressed air from a temperature usually of at least 80° C., or even higher, down to room temperature and then subsequently to precool the air before it is introduced into the adsorber or adsorbers, this usually being carried out by a refrigeration unit which cools the air from room temperature down to a temperature below room temperature.

This is, moreover, clearly explained in the document "Industrial Gases & Cryogenics Today, IOMA Broadcaster, Air Purification for cryogenic air separation units, January–February 1984, p. 15 et seq." or by the document EP-A-438,282.

In fact it is particularly recommended to precool the air before subjecting it to an adsorption separation step since, as is known by those skilled in the art, the lower the adsorption temperature the more effective the adsorption of the impurities.

In other words, the effectiveness of the air prepurification is markedly improved at low temperatures, that is to say temperatures close to 5° C., or improved even more at markedly lower temperatures.

Next, after its passage through the purification zone, that is to say in the adsorber or adsorbers, the air stripped of all or some of its deleterious impurities, especially of the $CO_2$ and $H_2O$ type, is then conventionally cooled to a cryogenic temperature, that is to say generally to a temperature of less than approximately −120° C., before being sent into the cryogenic distillation unit and introduced into one or more distillation columns for the purpose of being separated therein in order to recover the nitrogen, oxygen and/or argon.

However, the fact of having to employ an air precooling step before the air is introduced into the adsorber or adsorbers has several drawbacks which have a negative impact on the industrial advantage of the overall process.

This step of precooling the air has the effect of appreciably increasing the overall investment, of complicating the process, of possibly causing reliability problems and therefore of resulting in an additional cost for the plant, given that it is then necessary to provide cooling means, such as heat exchangers or the like, that is to say a refrigeration unit.

Mention may be made of the documents U.S. Pat. No. 4,249,915, EP-A-733393, EP-A-718576, U.S. Pat. No. 5,463,869 and JP-A-54103778 describing various processes for the treatment of the air before it is cryogenically separated for the purpose of producing nitrogen and oxygen.

SUMMARY OF THE INVENTION

Thus, the object of the present invention is to alleviate the abovementioned problems and drawbacks by providing a process for the cryogenic separation of air which does not require the air to be precooled by a refrigeration unit before it is introduced into the adsorber or adsorbers of the front-end scrubbing unit, that is to say a cryogenic air separation process which is simplified compared with the currently existing processes.

The present invention therefore relates to a process for the cryogenic separation of air containing impurities, which is carried out according to the steps of:

(a) compressing the air to be separated to a pressure of at least $11.4 \times 10^5$ Pa;

(b) introducing the air at a temperature greater than or equal to +15° C. and at a pressure of at least $11.4 \times 10^5$ Pa in at least one adsorption vessel containing particles of at least one adsorbent;

(c) adsorbing at least some of the impurities contained in the air on the particles of adsorbent at a pressure of at least $11.4 \times 10^5$ Pa;

(d) cooling the air purified in step (c) down to a cryogenic temperature of less than −120° C., preferably down to a temperature of less than −170° C.;

(e) cryogenically distilling the air cooled in step (d).

As a variant, the invention relates to a process for the cryogenic separation of air containing impurities, which is carried out according to the steps of:

(a) compressing the air to a pressure of at least $11.4 \times 10^5$ Pa;

(b) introducing the compressed air into at least one adsorption vessel containing particles of at least one adsorbent;

(c) adsorbing at least some of the impurities contained in the air on the particles of adsorbent at a pressure of at least $11.4 \times 10^5$ Pa and at a temperature of at least +15° C.;

(d) cooling the air purified in step (c) down to a cryogenic temperature of less than −120° C., preferably down to a temperature of less than −170° C.;

(e) cryogenically distilling the air cooled in step (d).

Depending on the case, the process according to the invention may comprise one or more of the following characteristics:

after cryogenic distillation, at least one compound chosen from nitrogen, oxygen, argon or their mixtures is recovered. The compound or compounds thus produced may be of variable purity and at least one of these compounds is preferably recovered in liquid form in order to utilize the energy provided by the increase in the pressure of the air;

in step (c), the adsorption is carried out at a pressure of at least $12 \times 10^5$ Pa, preferably at least $15 \times 10^5$ Pa, at least $20.1 \times 10^5$ Pa, preferably at least $20.5 \times 10^5$ Pa, and preferably at a pressure ranging from $21 \times 10^5$ Pa to $40 \times 10^5$ Pa, advantageously from $22 \times 10^5$ Pa to $38 \times 10^5$ Pa;

the compressed air is not precooled after step (a) and before step (b);

in step (a), the compression is carried out at a pressure of at least $12 \times 10^5$ Pa, preferably at least $15 \times 10^5$ Pa, at least $20.1 \times 10^5$ Pa, preferably at least $20.5 \times 10^5$ Pa, and preferably at a pressure ranging from $21 \times 10^5$ Pa to $40 \times 10^5$ Pa, advantageously ranging from $22 \times 10^5$ Pa to $38 \times 10^5$ Pa;

in step (b), the air introduced into the adsorption vessel is at an adsorption temperature of at least +21° C., preferably ranging from +25° C. to +65° C., advantageously from +30° C. to +50° C. When the air leaving the compression step is at too high a temperature, for example +80° C., it is cooled in order to bring it into a temperature range of the process according to the invention but, in all cases, to a temperature of at least +15° C. In other words, the process of the invention may optionally include a complementary step of adjusting the temperature of the air, after step (a) and before step (b), but without accordingly constituting a conventional precooling step using a refrigeration unit. Advantageously, this complementary step of adjusting the temperature of the air simply consists in decreasing the temperature of the air by heat exchange by means of one or more heat exchangers, preferably exchangers through which water circulates;

in step (c), the adsorbed impurities are chosen from the group formed by carbon dioxide, water vapour, nitrogen oxides, sulphur oxides and hydrocarbons;

the adsorbent is chosen from zeolites, aluminas, silica gels and mixtures thereof;

the cryogenic distillation of step (e) is carried out at a pressure ranging from $10^5$ Pa to $30 \times 10^5$ Pa, preferably about $1.3 \times 10^5$ Pa to $20 \times 10^5$ Pa;

it furthermore includes a step of regenerating the adsorbent at a regeneration temperature of between 40° C. and 350° C., preferably between 100° C. and 280° C. In a manner known per se, the adsorbent is cylically regenerated by heating it to the regeneration temperature by flushing the adsorbent particles with a gas at the desired regeneration temperature, preferably a gas chosen from nitrogen or a mixture of nitrogen and oxygen;

the rate of regeneration is equal to 5 to 70% of the rate of adsorption;

the rate of adsorption is between 250 $Sm^3/h$ and $10^6$ $Sm^3/h$;

the regeneration pressure is between $1 \times 10^5$ Pa and $30 \times 10^5$ Pa;

in step (c), the adsorption of the impurities contained in the air is carried out in a TSA-type cycle;

the particles of adsorbent are chosen from zeolite particles of the faujasite, X, LSX, A or mordenite type, or mixtures thereof, and preferably the zeolite particles are of the X or LSX type having an Si/Al ratio $\leq 1.15$, preferably approximately 1;

the particles of adsorbent are chosen from particles of activated alumina and of impregnated alumina;

at least one adsorber contains at least one bed or at least one layer of zeolite particles and at least one bed or at least one layer of alumina particles and preferably at least one bed or at least one layer of alumina particles is located upstream of at least one bed or at least one layer of zeolite particles with respect to the direction of flow of the air.

Moreover, the invention also relates to a plant for the cryogenic separation of air, capable of carrying out the process according to the invention, characterized in that it comprises, arranged in series:

at least one air compression means for compressing the air to a pressure of at least $11.4 \times 10^5$ Pa, preferably an air compressor;

at least one heat exchanger to adjust, if necessary, the temperature of the air to a value of at least +15° C., preferably of between +30° C. and +50° C.;

at least one adsorber, preferably at least two adsorbers arranged in parallel, containing at least one bed or at least one layer of particles of at least one adsorbent;

at least one cold box for cooling the purified air leaving at least one adsorber down to a cryogenic temperature of less than approximately −120° C.; and at least one cryogenic distillation column for separating, by cryogenic distillation, the air cooled in the cold box, to the exclusion of a plant comprising a refrigerating system arranged between the at least one heat exchanger and the at least one adsorber.

Advantageously, the plant furthermore includes at least one turbine arranged downstream of the cold box, that is to say between the cold box and the distillation column or columns.

Furthermore, each air compression means is preferably associated with at least one heat exchanger.

In addition, the invention also relates to a process for the purification of air containing impurities, which is carried out according to the steps of:

(a) compressing the air to a pressure of at least $11.4 \times 10^5$ Pa, preferably to at least $15 \times 10^5$ Pa;

(b) introducing the compressed air into at least one adsorption vessel containing particles of at least one adsorbent;

(c) adsorbing at least some of the impurities contained in the air on the said particles of adsorbent at a pressure of at least $11.4 \times 10^5$ Pa, and at a temperature of at least +15° C., preferably at at least +21° C.;

(d) recovering the air purified in step (c).

Preferably, the process is carried out as described above, the purified air recovered in step (d) possibly being subsequently separated by cryogenic distillation.

The invention will now be more clearly understood with the aid of the following comparative example and the appended figures, given by way of illustration but implying no limitation.

DETAILED DESCRIPTION OF THE INVENTION

Comparative Example

In order to show the effectiveness of the process according to the present invention, comparative tests were carried out using, on the one hand, an air separation process according to the prior art with or without precooling before the impurities are removed by adsorption and, on the other hand, an air separation process according to the present invention.

Figure 1:
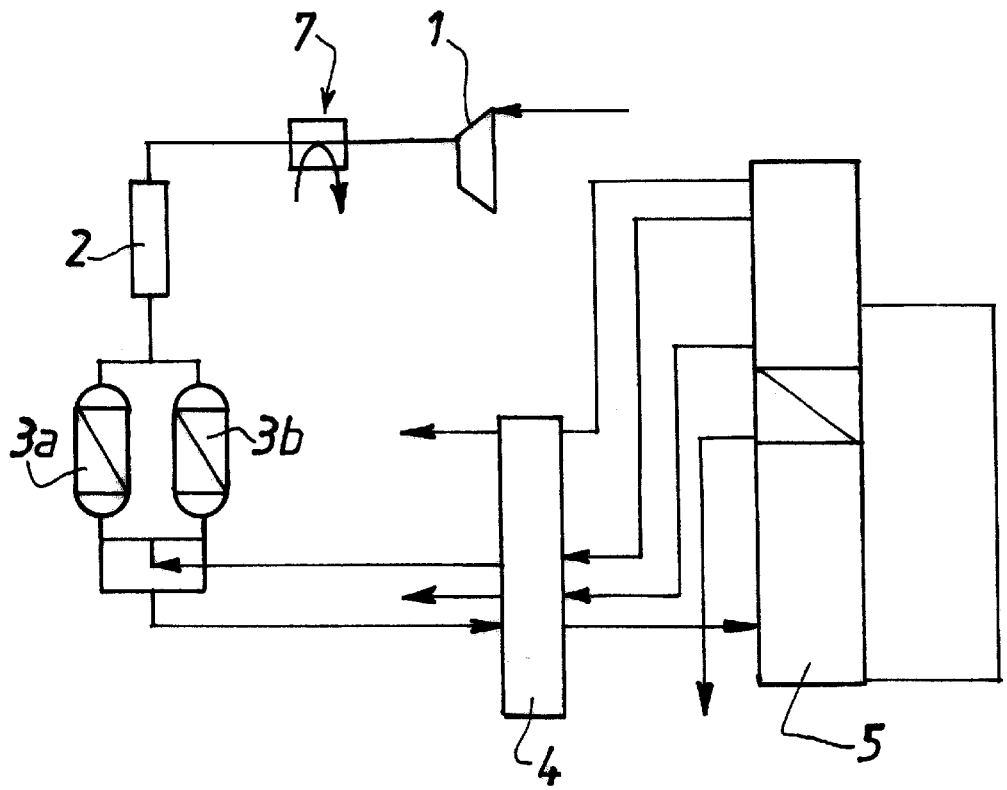
FIG. 1 is a schematic representation of a known plant for the cryogenic separation of air.
Figure 2:
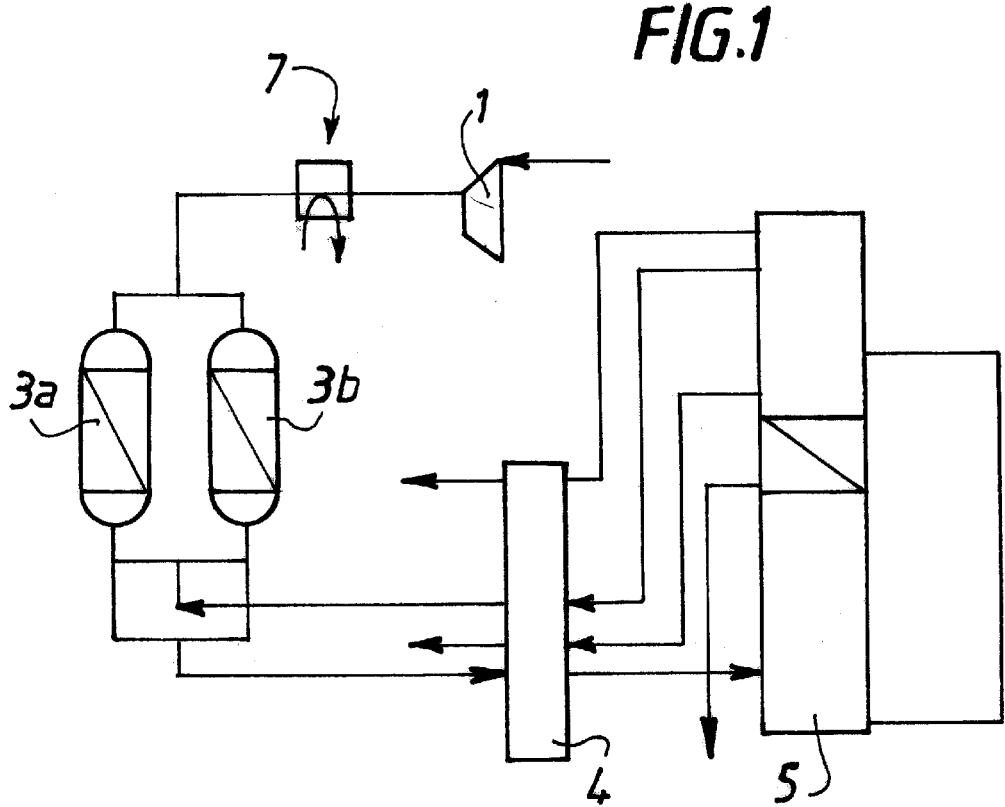
FIG. 2 is a schematic representation of a plant for the cryogenic separation of air according to the present invention.

The process according to the prior art was carried out by means of a known plant, such as the one illustrated in FIG. 1, whereas the process according to the invention was carried out with a plant according to the present invention, as shown diagrammatically in FIG. 2.

More specifically, FIG. 1 shows schematically a plant for the cryogenic separation of air in which the atmospheric air containing impurities, particularly of the $CO_2$ and/or water-vapour type, is successively:

- compressed by a compressor 1, for example of the water-cooling type;
- slightly adjusted in terms of temperature by a water-flow heat exchanger 7;
- precooled by a refrigeration unit or refrigerating system 2 down to a temperature of about +5° C. or even less than +5° C.;
- introduced into one or other of the adsorbers 3a and 3b in order to be purified therein by adsorption of the impurities on one or more beds of adsorbent, for example a zeolite-type adsorbent;
- cooled to a cryogenic temperature, for example to −170° C., in a cold box 4 containing one or more heat exchangers;
- and then separated by cryogenic distillation in one or more cryogenic distillation columns 5 for the purpose of producing nitrogen and/or oxygen, especially in liquid and/or gaseous form.

In other words, according to this process of the prior art, the air is subjected to a precooling step by the refrigerating system 2 before it is purified by adsorption in the adsorbers 3a or 3b, operating in parallel.

On the other hand, FIG. 2 shows a diagram of a plant for the cryogenic separation of air according to the present invention, which is similar to that in FIG. 1, except that, in this case, the refrigerating system 2 has been omitted.

In other words, according to FIG. 2, the air, after compression and possible adjustment (at 7) of its temperature to a temperature of at least +15° C., preferably ranging from +25 to +50° C., is sent directly into at least one of the adsorbers 3a and 3b in order to be pretreated therein before it is cooled to the cryogenic temperature and separated by cryogenic distillation as previously.

One consequence of omitting the precooling step (at 2) before adsorption (FIG. 2) is that the adsorption temperature is markedly higher than in the prior art (FIG. 1) and therefore more unfavorable to adsorption.

In order to compensate for this reduction in the adsorption performance according to the present invention, the adsorption process is also carried out, on the one hand, with an increase in the adsorption pressure and, on the other hand, with a possible increase in the amount of adsorbent used.

This is because the inventors have demonstrated, as shown in the table below, that, in order to achieve effective adsorption of the impurities contained in the air, in the absence of the step of precooling by the refrigerating system 2 before adsorption, it is necessary to significantly increase the adsorption pressure of the air, that is to say to purify the air in the adsorbers 3a and 3b at a pressure of at least $11.4 \times 10^5$ Pa, preferably at least $15 \times 10^5$ Pa and possibly up to $40 \times 10^5$ Pa.

This increase in pressure makes it possible, on the one hand, to reduce the water-vapour content of the flow of air and, on the other hand, to favour the adsorption of the impurities contained in the air by increasing their partial pressure.

The experimental conditions and the results are given in the table below.

TABLE

| Trials | With precooling | Without precooling | Without precooling |
|---|---|---|---|
| Rate of adsorption ($Sm^3/h$) | 50,000 | 50,000 | 50,000 |
| Adsorption temperature | 10 ° C. | 35 ° C. | 35 ° C. |
| Adsorption pressure | $6 \times 10^5$ Pa (prior art) | $6 \times 10^5$ Pa (prior art) | $30 \times 10^5$ Pa (invention) |
| Rate of regeneration ($Sm^3/h$) | 10,000 | 24,000 | 10,000 |
| Regeneration temperature | 150 ° C. | 150 ° C. | 150 ° C. |
| Regeneration pressure | $1.1 \times 10^5$ Pa | $1.1 \times 10^5$ Pa | $1.1 \times 10^5$ Pa |

TABLE-continued

| Trials | With precooling | Without precooling | Without precooling |
| --- | --- | --- | --- |
| Cycle time (minutes) | 150 | 250 | 200 |
| Mass of adsorbent | 8900 kg | 51,000 kg | 13,500 kg |

It is clearly apparent from the above table that the trials according to the invention (the right-hand column), which are based on the absence of precooling by a refrigerating system and an increase in the adsorption pressure, lead to results which are completely satisfactory from the industrial standpoint, that is to say results substantially equivalent to those obtained by using an additional precooling step (left-hand column) with a refrigeration unit (after an optional step of adjusting the temperature by heat exchange with water or another coolant) and, in all cases, results which are much better than those obtained by using a process without precooling and without increasing the adsorption pressure (middle column) which requires the use of a very large quantity of adsorbent.

What is claimed is:

1. Process for the cryogenic separation of air containing impurities, which comprises the steps of:
   (a) compressing the air to be separated to a pressure of at least $20.1 \times 10^5$ Pa;
   (b) introducing the air at a temperature greater than or equal to +15° C. and at a pressure of at least $20.1 \times 10^5$ Pa in at least one adsorption vessel containing particles of at least one adsorbent, without precooling the compressed air between steps (a) and (b);
   (c) adsorbing at least some of the impurities contained in the air on said adsorbent particles at a pressure of at least $20.1 \times 10^5$ Pa;
   (d) cooling the air purified in step (c) down to a cryogenic temperature of less than −120° C.; and
   (e) cryogenically distilling the air cooled in step (d).

2. The process according to claim 1, wherein the adsorption in step (c) is carried out at a pressure of at least $20.5 \times 10^5$ Pa.

3. The process according to claim 1, wherein the air in step (a) is compressed to a pressure of at least $20.5 \times 10^5$ Pa.

4. The process according to claim 1, wherein the air in step (a) is compressed to a pressure ranging from $21 \times 10^5$ Pa to $40 \times 10^5$ Pa.

5. The process according to claim 1, wherein the air introduced into the adsorption vessel in step (b) is at an adsorption temperature ranging from +25° C. to +65° C.

6. The process according to claim 1, wherein the adsorbed impurities in step (c) are selected from the group consisting of carbon dioxide, water vapor, nitrogen oxides, sulfur oxides and hydrocarbons.

7. The process according to claim 1, wherein the adsorbent is selected from the group consisting of zeolites, aluminas, silica gels and mixtures thereof.

8. The process according to claim 1, wherein the adsorption of the impurities contained in the air in step (c) is carried out in a TSA cycle.

9. The process according to claim 1, further comprising a complementary step after step (a) and before step (b) of adjusting the temperature of the air to a temperature of between +30° C. and +50° C.

10. The process according to claim 9, wherein the temperature adjustment is carried out by at least one water exchanger.

11. Plant for the cryogenic separation of air, capable of carrying out the process according to claim 1, comprising arranged in series:
   at least one air compression means for compressing the air to a pressure of at least $20.1 \times 10^5$ pa;
   at least one heat exchanger for adjusting the temperature of the air to a value of at least +15° C.;
   at least one adsorber containing at least one bed or at least one layer of particles of at least one adsorbent;
   at least one cold box for cooling the purified air leaving said at least one adsorber down to a cryogenic temperature of less than about −120° C.; and
   at least one cryogenic distillation column for separating, by cryogenic distillation, the air cooled in the cold box, to the exclusion of a plant comprising a refrigerating system arranged between said at least one heat exchanger and said at least one adsorber.

12. The plant according to claim 11, further comprising at least one turbine arranged downstream of the cold box.

13. Process for the cryogenic separation of air containing impurities, which comprises the following steps:
   (a) compressing the air to a pressure of at least $20.1 \times 10^5$ Pa;
   (b) introducing the compressed air into at least one adsorption vessel containing particles of at least one adsorbent, without precooling the compressed air between steps (a) and (b);
   (c) adsorbing at least some of the impurities contained in the air on said adsorbent particles at a pressure of at least $20.1 \times 10^5$ Pa and at a temperature of at least +15° C.;
   (d) cooling the air purified in step (c) down to a cryogenic temperature of less than −120° C. and
   (e) cryogenically distilling the air cooled in step (d).

14. The process according to claim 13, wherein the adsorbed impurities in step (c) are selected from the group consisting of carbon dioxide, water vapor, nitrogen oxides, sulfur oxides and hydrocarbons; the a desorption temperature ranging from +25° C. to +65° C. and wherein the air in step (a) is compressed to a pressure ranging from $21 \times 10^5$ Pa and $40 \times 10^5$ Pa.

15. Process for the purification of air containing impurities, which comprises the following steps:
   (a) compressing the air to a pressure of at least $20.1 \times 10^5$ Pa;
   (b) introducing the compressed air into at least one adsorption vessel containing particles of at least one adsorber;
   (c) adsorbing at least some of the impurities contained in the air on said adsorbent particles at a pressure of at least $20.1 \times 10^5$ Pa and at a temperature of at least +15° C.; and
   (d) recovering the air purified in step (c).

16. The process according to claim 15, wherein the purified air recovered in step (d) is subsequently separated by cryogenic distillation.

* * * * *